United States Patent
Solimene et al.

[11] Patent Number: 5,828,376
[45] Date of Patent: Oct. 27, 1998

[54] MENU CONTROL IN A GRAPHICAL USER INTERFACE

[75] Inventors: Vito Solimene, Englewood; Robert Provencal, Denver, both of Colo.

[73] Assignee: J. D. Edwards World Source Company, Denver, Colo.

[21] Appl. No.: 717,639

[22] Filed: Sep. 23, 1996

[51] Int. Cl.[6] .................................................. G06F 15/00
[52] U.S. Cl. ........................... 395/352; 345/354; 345/340
[58] Field of Search .................................... 345/352, 353, 345/354, 340, 341, 339, 326, 342, 330; 707/4

[56] References Cited

U.S. PATENT DOCUMENTS

| | | | |
|---|---|---|---|
| 4,896,291 | 1/1990 | Gest et al. | 364/900 |
| 5,206,949 | 4/1993 | Cochran et al. | 707/4 |
| 5,276,795 | 1/1994 | Hoeber et al. | 395/156 |
| 5,345,550 | 9/1994 | Bloomfield | 395/156 |
| 5,347,626 | 9/1994 | Hoeber et al. | 395/156 |
| 5,611,031 | 3/1997 | Herzfeld et al. | 345/433 |
| 5,613,122 | 3/1997 | Burnard et al. | 395/651 |
| 5,623,588 | 4/1997 | Gould | 345/326 |

OTHER PUBLICATIONS

Simpson, *Mastering Word Perfect® 5.1 & 5.2 for Windows*™, Sybex Inc., Alameda, CA, 1993, Appendix B.

*Primary Examiner*—Raymond J. Bayerl
*Assistant Examiner*—Steven P. Sax
*Attorney, Agent, or Firm*—James R. Young

[57] ABSTRACT

In a graphical user interface (GUI) for a personal computer system, an improved method and apparatus for accessing and executing commands associated with user applications. In addition to the standard menu categories of a menubar and control icons of a tool bar, the present invention provides a "hyperbutton", a "context sensitive pop-up menu" and a "menu control editor". A hyperbutton displays, in a persistent subview, a user selected default hyperitem from the hyperitems of the menubar. The default hyperitem is automatically executed when selected by the user with a mouse. The hyperbutton displays a title of the default hyperitem. The user can change the default hyperitem using a pop-up menu displayed in response to an interface command such as a right mouse button. A context sensitive pop-up menu is associated with a particular object such as a grid subview. The user configures the context sensitive pop-up menu to contain a custom set of the hyperitems associated with the object. A hyperitem editor allows the user to configure the hyperbutton and context sensitive pop-up menu by defining the associated hyperitems and their attributes.

19 Claims, 13 Drawing Sheets

MENU CONTROL IN A GRAPHICAL USER INTERFACE

FIELD OF THE INVENTION

The present invention relates to a graphical user interface (GUI) for a computer system, particularly to an apparatus and method for configuring and accessing menu items that control operation of user applications.

BACKGROUND OF THE INVENTION

Most personal computers today run under an operating system that provides a graphical user interface (GUI) for accessing user applications. Through a consistent interface of windows, pull-down menus, and toolbars, GUI operating systems have simplified PCS and have rendered the technology more "user friendly" by obviating the task of memorizing arcane keyboard sequences. In addition, users can now manipulate their data as if it were real, physical entities. A window, for example, can represent a file and the contents of the window can represent the records of the file. The window can be opened, closed, or set aside on a "desk top" as if it were an actual object. The records of the file can be created, deleted, modified and arranged in a drag-and-drop fashion as if they too were physical objects. The most common GUI operating systems that provide this "object-oriented" environment for personal computers are Microsoft Windows and the Apple Macintosh operating systems.

FIG. 2A illustrates a typical example of a computer application operating under a GUI operating system. In this example application, the user manages records in an Address Book where each record includes three fields: an address number, a name, and a street address. To enter new information into the Address Book, the user selects an empty field with the mouse and types information into the field. To modify information in a field, the user selects the field with the mouse and types over the old information. The user can also drag-and-drop the records using the mouse to arrange the records into any desired sequence. A scroll bar allows the user to scroll up or down the list of records by selecting an up arrow or a down arrow, respectively.

The Address Book itself is contained within a window that represents a file stored on a hard disk such that when the user opens the file, the window is opened and the address book records are retrieved and displayed in a grid subview. The window contains an up-down scroll bar and a left-right scroll bar for positioning information within the window. If, for example, in addition to the Address Book subview the window contained a Telephone Book subview positioned below the Address Book subview, the user could use the window's up-down scroll bar to scroll down to the Telephone Book subview.

In addition to providing a convenient method for displaying and scrolling information in windows (or subviews), prior art GUIs also provide a simple method for executing various commands associated with user information. These commands are normally executed from a menubar displayed across the top of the screen, or alternatively across the top of the application window, or executed from a toolbar comprising a plurality of push-button control icons associated with each command.

The menubar normally comprises a number of menu categories, for example, "File", "Edit", "Setup", etc., and associated with each menu category is a group of menu items or commands for manipulating user data. These menu items are normally displayed in a pull-down menu when the user selects a menu category from the menubar with the mouse. For example, FIG. 2B illustrates the user selecting the "Text" menu category in order to display a pull-down menu comprised of various menu items for manipulating the format of the text entered in the Address Book subview. Each menu item has a short title, for example "Font", "Size", etc., that helps identify the command associated with the menu item, with a more detailed explanation displayed at the bottom left corner of the window.

A menu item in the pull-down menu corresponds to a command; for example, the "Bold" menu item will cause selected text to appear in bold face. Some menu items, such as "Size", are also menu categories which, when selected, display yet another pull-down menu. This system of nested menus is referred to as hierarchical or cascaded menus. A menu item may also have a "quick-key" equivalent, such as % B for the "Bold" menu item, so that the user can execute the command quickly without having to plod through the menu system. However, "quick-keys" must be memorized which is not appreciated by all users.

An alternative to memorizing "quick-keys" is a toolbar of control icons normally located adjacent to or within the application window. The toolbar provides quick access to a select number of the menu items by displaying a menu item in the form of a mnemonic control icon which can be executed by selecting it with the mouse. For example, the user can select the printer icon to send information to the printer rather than selecting the "File" menu category from the menubar and then selecting the "Print" menu item from the pull-down menu.

There are prior art methods which have enhanced the operation of conventional GUI menubars and toolbars, making access to the user commands even faster and easier. Hoeber et al. discloses one such enhancement in U.S. Pat. No. 5,276,795 entitled "method and Apparatus for Selecting and Executing Defaults in a Window Based Display System." According to the Hoeber patent, the user selects a default menu item from each menu category and the default menu item is automatically executed when the user selects the corresponding menu category using a first selection criteria, for example, pressing a left mouse button. If the user selects the menu category using a second selection criteria, for example, pressing a right mouse button, then the entire pull-down menu is displayed. As an example, the user could select the "Bold" menu item as the default command for the "Text" menu category in the menubar of FIG. 2B. Then, whenever the user selects the "Text" menu category with the left mouse button, the "Bold" menu command is automatically executed without having to select it from the pull-down menu. If the user selects the "Text" menu category with the right mouse button, however, then the pull-down menu is displayed allowing the user to select another menu item or change the default menu item.

Also according to the Hoeber patent, when the user selects the "Text" menu category with the left mouse button, the title of the menu category changes to the title of the default menu item ("Bold" in this example). However, after executing the default command, the title of the menu category reverts back to its original state ("Text" in this example).

In another prior art method for enhancing operation of standard menubars, Now Software provides a utility program called Now Utilities. With Now Utilities, the user can configure any application program so that the menubar appears as a pop-up menu in response to a predetermined selection criteria (e.g., simultaneously pressing a mouse button and a preselected keyboard sequence). This is illustrated in FIG. 2C where the entire menubar has been displayed as a pop-up menu in response to the user simultaneously pressing a mouse button and an "Option" key. In this manner, the user can quickly scroll through all of the menu categories and select any menu item from a single pop-up menu.

In yet another prior art method which enhances the standard menubar system, Microsoft Word provides a "Short Cut" menu which displays, in a pop-up menu, a predetermined number of the most recent commands executed on an object. For example, if the most recent commands executed on an address book record were "Add Record", "Del Record", and "Copy Record", then these commands would appear in a pop-up menu when the user selected any address book record with the right mouse button. This provides a convenient, quick method for accessing the most recent commands executed on an object without having to plod through the pull-down menus of the menubar. However, only a predetermined number of the most recent commands executed on an object will appear in the pop-up menu; the user cannot configure the pop-up menu to contain a custom set of commands.

The present invention improves still further on the prior art methods for accessing and executing application commands in a graphical user interface for personal computer systems.

SUMMARY OF THE INVENTION

It is an aspect of the present invention to provide a plurality of user selection tools, all derived from a common specification.

It is another aspect of the invention to provide a user selection tool, called a hyperbutton, displayed in a persistent subview, that automatically executes a default menu item selected from the common specification.

A further aspect of the invention is to provide a navigating icon within the hyperbutton which, when selected, displays a pop-up menu of the entire common specification, and allows a user to select the default menu item from the common specification.

In a graphical user interface (GUI) for personal computer systems, a "hyperbutton" displayed in a persistent subview comprises a default menu item selected from any of the menu categories of a common specification, as displayed in a menubar. The user can automatically execute the default menu item associated with the hyperbutton by selecting the hyperbutton with the mouse, rather than plod through the pull-down menus associated with the menu categories of the menubar. The title of the default menu item is persistently displayed in the hyperbutton subview, thereby providing a convenient mnemonic as to the current function for the hyperbutton. The hyperbutton subview also displays a navigating icon, such as an arrow, that displays a pop-up menu of the entire menubar when selected by the user. From this pop-up menu the user can execute any of the menu items in the menubar, or the user can change the default menu item associated with the hyperbutton by selecting a new menu. After selecting a new default menu item, its title replaces the title of the old menu item in the hyperbutton subview.

In an alternative embodiment, the hypercontrol contains a control icon in a toolbar. The hypercontrol toolbar icon is displayed persistently in the toolbar. If the toolbar icon represents a hyperitem, the hyperitem is executed automatically when the toolbar icon is selected with the mouse. If the toolbar icon represents a hypercategory, when the toolbar icon is selected by a user, a dropdown menu of icons appears with the hyperitems from the hypercategory. From this pop-up menu the user can select and execute a hyperitem.

In another aspect of the present invention, the user can select a menu item from a context sensitive pop-up menu. A context sensitive pop-up menu contains configurable commands associated with a particular subview.

The present invention further provides a hyperitem editor for configuring the hypercontrol and context sensitive pop-up menus. The editor allows the application developer to create new hypercategories or hyperitems or modify existing hypercategories or hyperitems, including the ability to insert hyperitems into the menubar, toolbar, hyperbutton or a context sensitive pop-up menu, configure the hierarchical format of the menubar, and define an action executed by a menu item.

BRIEF DESCRIPTION OF THE DRAWINGS

The foregoing, and other features and aspects of the present invention and the manner of attaining them will become more apparent, and the invention itself will be best understood by reference to the following description of a preferred embodiment taken in conjunction with the accompanying drawings, wherein.

DESCRIPTION OF THE PREFERRED EMBODIMENT

System Overview

Figure 1:
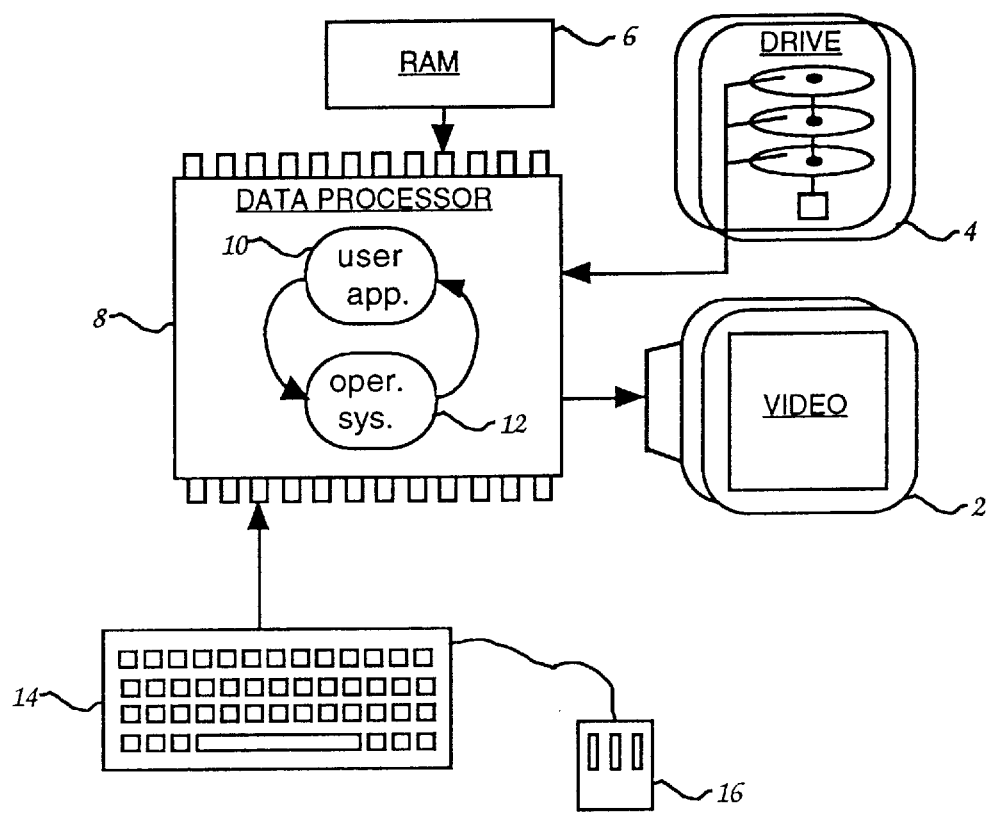
FIG. 1 shows a personal computer system operating under the graphical user interface of the present invention.

FIG. 1 illustrates the interconnecting components of a personal computer system operating under a graphical user interface (GUI) such as Microsoft Windows or Apple Macintosh operating system. A data processor 8 interfaces to a number of peripheral devices including random access memory (RAM) 6, a hard disk drive 4, a video screen 2, a keyboard 14 and a mouse 16. The hard disk drive 4 stores user applications 10 and user data commonly in the form of records which are temporarily stored in the RAM 6 while operated on by the data processor 8. The video screen 2 displays the windows, subviews, menubar, toolbar and other GUI objects associated with the user applications and user data. The user controls operation of the applications and modifies the user data by providing control signals to the data processor 8 through the keyboard 14 and mouse 16. The mouse 16 normally comprises a left, center and right mouse buttons where each mouse button sends a different command to the data processor 8. The data processor 8 runs under an operating system 12 that provides the windows and other objects necessary to implement a graphical user interface (e.g., Microsoft Windows or Apple Macintosh operating system).

Figure 2A:
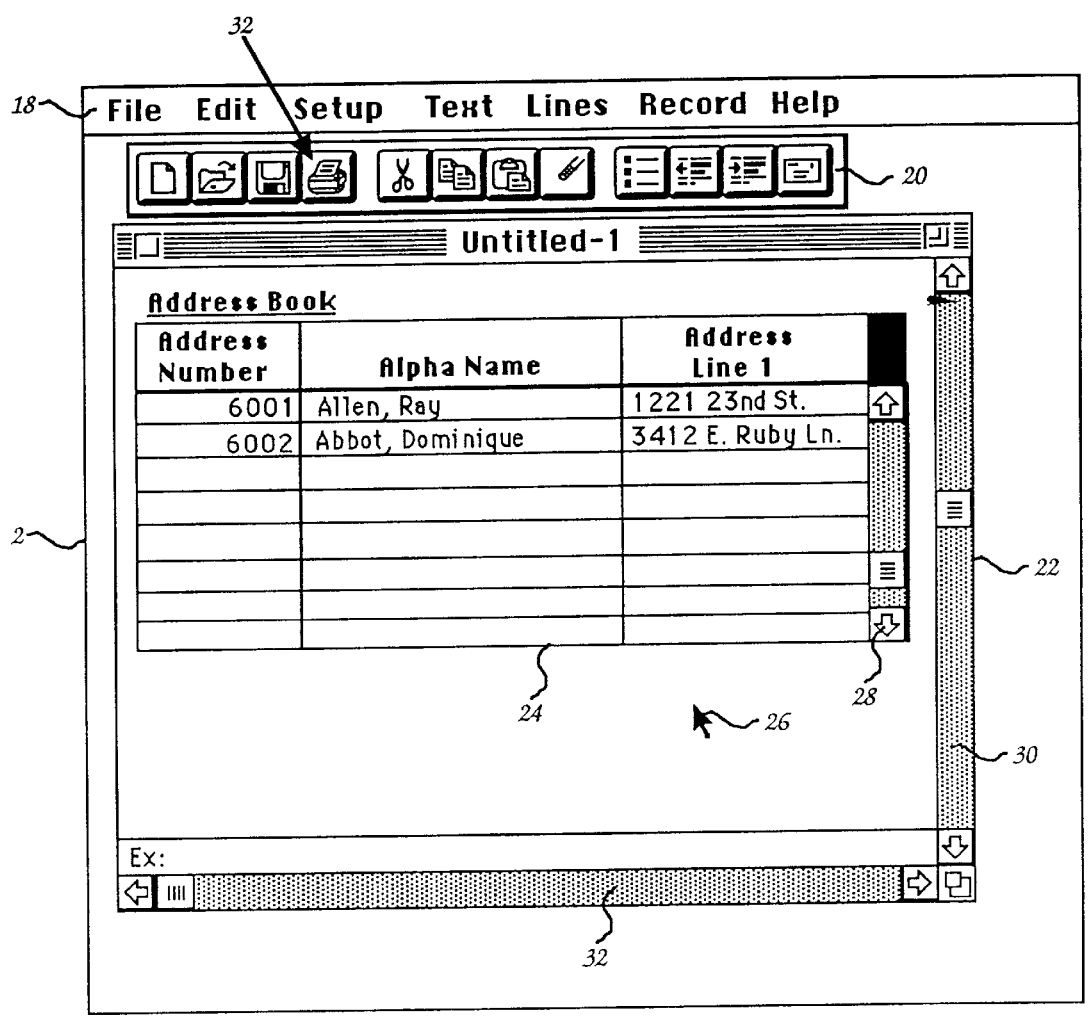
FIG. 2A illustrates a conventional GUI including a scrolling window, subview, menubar and toolbar.

FIG. 2A shows an example prior art graphical user interface displayed on the video screen 2 of FIG. 1. The objects displayed on the screen 2 include a menubar 18, a toolbar 20 and an application window 22. The application in this example allows the user to edit records of an Address Book where the records are stored in a file on the disk drive 4. When the user opens the file, the window 22 is opened and the records are displayed in a grid subview 24.

To enter a new record into the grid subview 24, the user positions a mouse cursor 26 over any empty record, depresses the mouse button to select it, and then types information associated with the new record into the field. The user can also modify an existing record by selecting it with the mouse and typing over the old information. A scrollbar 28 along the right side of the grid subview 24 allows the user to scroll up and down the list of records. The window 22 also comprises an up-down scroll bar 30 and left-right scroll bar 32 for scrolling the subviews within the window.

Figure 2B:
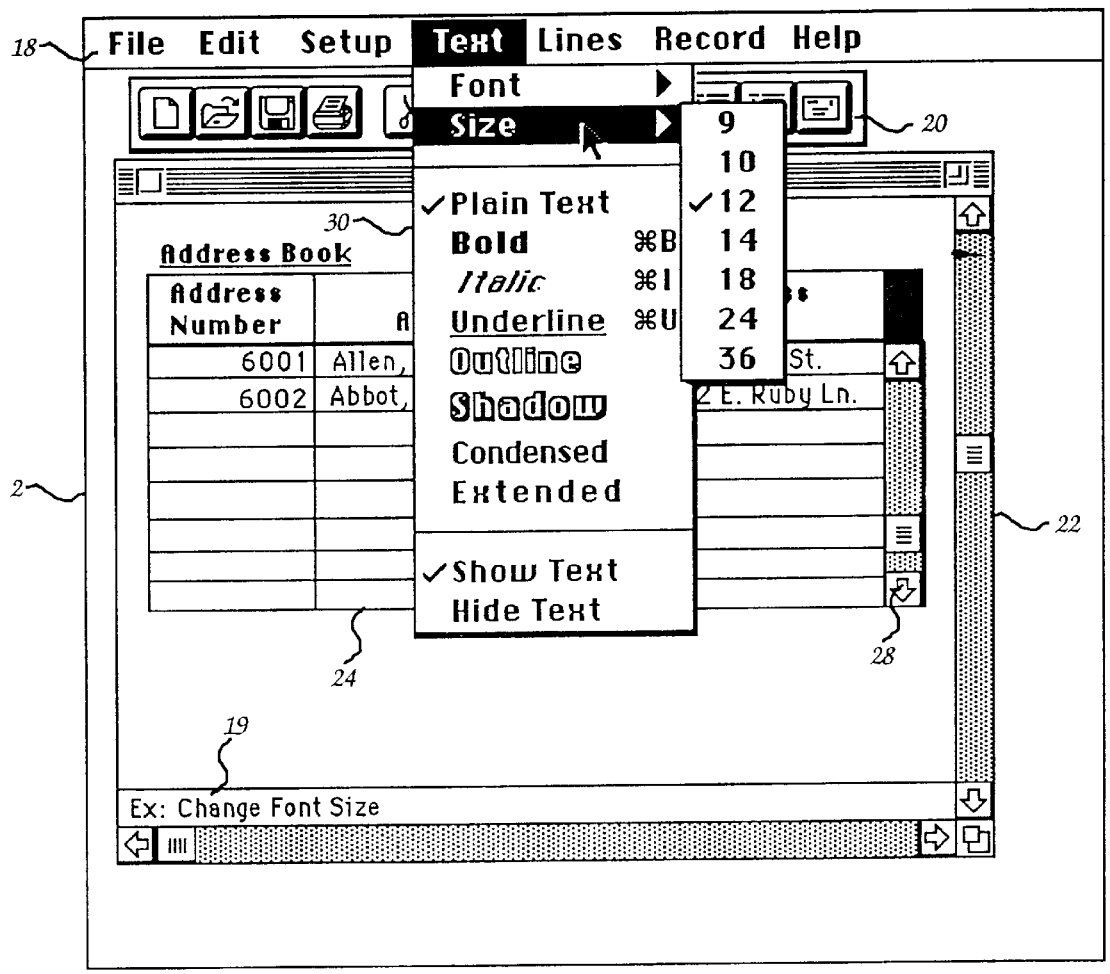
FIG. 2B shows a conventional pull-down menu displayed when the user selects a menu category from the menu bar.
Figure 2C:
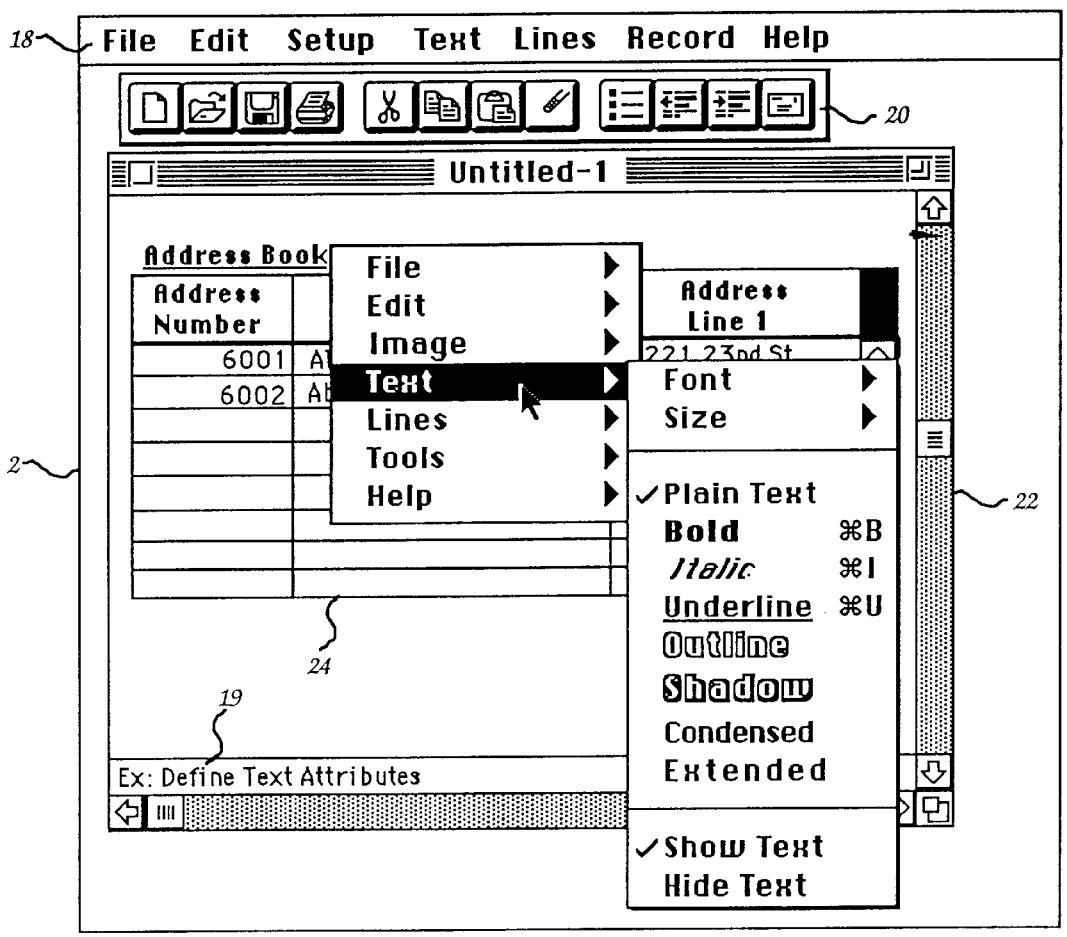
FIG. 2C illustrates the prior art Now Utilities pop-up menu of the menubar.

There are several commands provided to the user to facilitate operation of an application. Conventionally, these commands are stored either in a plurality of menu categories of a menubar, or as control icons in a toolbar. FIG. 2A illustrates a menubar 18 comprised of various menu categories including "File", "Edit", "Setup", etc., where each menu category comprises a number of menu items displayed in a pull-down menu when the menu category is selected by the user with the mouse. FIG. 2B illustrates the pull-down menu 30 of the "Text" menu category which displays a number of menu items including "Font", "Size", "Plain Text", etc. . The "Font" and "Size" menu items are also menu categories which display yet another pull-down menu when selected; that is, the "Text" menu category contains two cascaded menus.

FIG. 2A also illustrates a conventional toolbar 20 comprised of a number of control icons, wherein each control icon is associated with one of the menu items in the menubar 18. For example, the printer icon 32 is associated with the "Print" menu item of the "File" menu category. The control icons of the toolbar 20 allow the user to execute a menu item immediately without having to plod through the pull-down menus of the menubar 18.

Associated with each menu category and menu item is a short title (e.g., "File", "Text", "Cut", etc.) and a more detailed description displayed in an explanation subview 19 at the lower left corner of the window 22 as shown in FIG. 2B. The short title of the selected menu item is "Size", and the more detailed description displayed in the explanation subview 19 is "Change Font Size". The detailed description changes accordingly as the user positions the mouse cursor over a new menu category, menu item, or control icon in the toolbar 20. The title of a menu category or menu item, detailed description, and control icon are configured using the control editor of the present invention as described below.

Operating systems that implement a graphical user interface are normally event driven; that is, the operating system will generate an event in response to user input or other temporal events. For example, when the user depresses the mouse button, the operating system generates a mouse-down event including the screen coordinates of the mouse cursor and the mouse button pressed (left, center or right). The operating system may then pre-process the event and generate yet another event, or it might pass the event directly onto the user application for processing. When a mouse-down event occurs in the screen coordinates of a menu category in the menubar 18, for example, the operating system will perform the operation of displaying the selected menu category's menu items in a pull-down menu. If the user selects a menu item from the pull-down menu, the operating system will generate a menubar event, insert the selected menu item into the event, and pass the menubar event to the user application for processing.

Not all control objects of a graphical user interface are implemented by the operating system. For those that are not, the user application must process the original mouse down event, determine that it occurred within the subview of a control object, and perform the user interface operations similar to the operating system's implementation of the menubar as described above. For example, if the toolbar is not implemented by the operating system, then the user application must process the mouse-down event when a user selects a control icon from the toolbar and generate the appropriate toolbar event.

The context sensitive pop-up menus and hyperbutton of the present invention are not part of the operating system; they fall into the category of control objects that must be implemented by the user application 10. Alternatively, they could be add to the operating system 12 as a device driver, an operating system utility executed when the computer system boots as is well understood by those skilled in the art of computer programming.

Hypercontrol: Overview

Figure 3A:
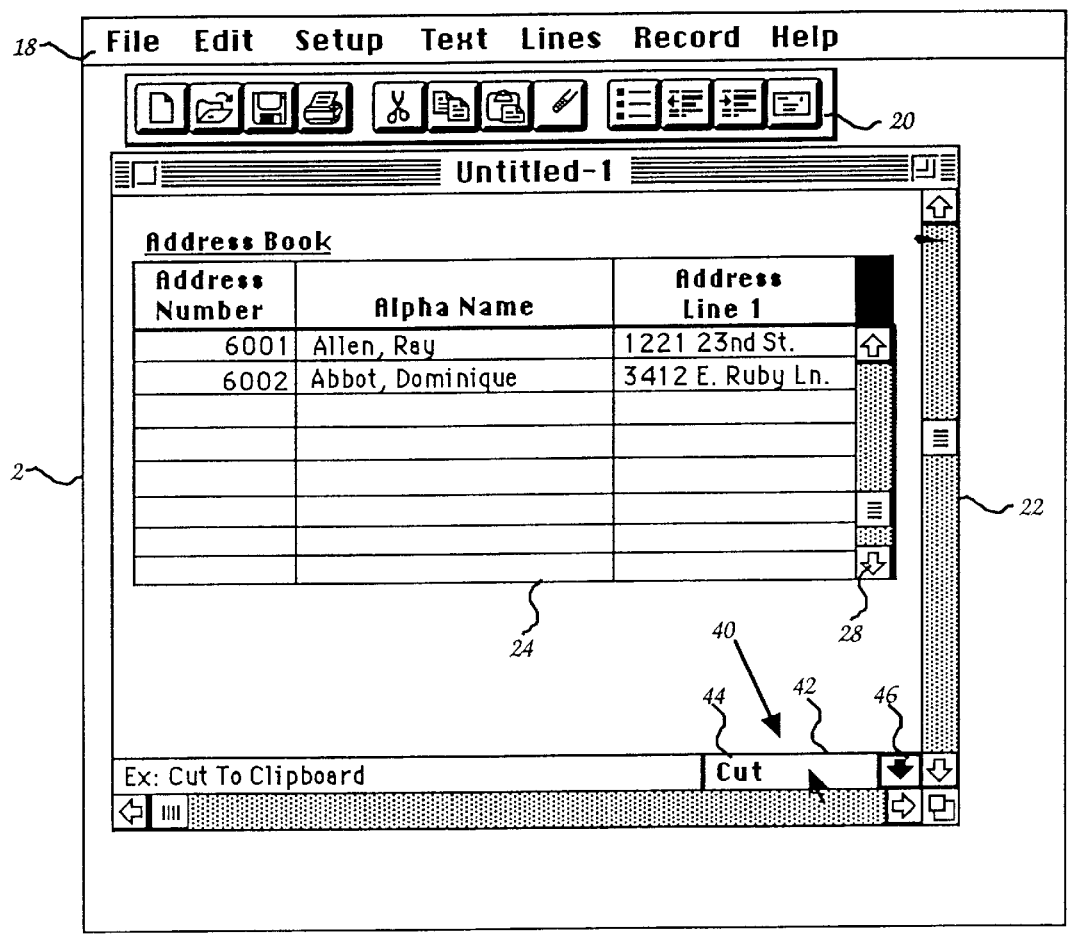
FIG. 3A shows the hyperbutton control of the present invention including a title of a default menu item and navigating icon.
Figure 3B:
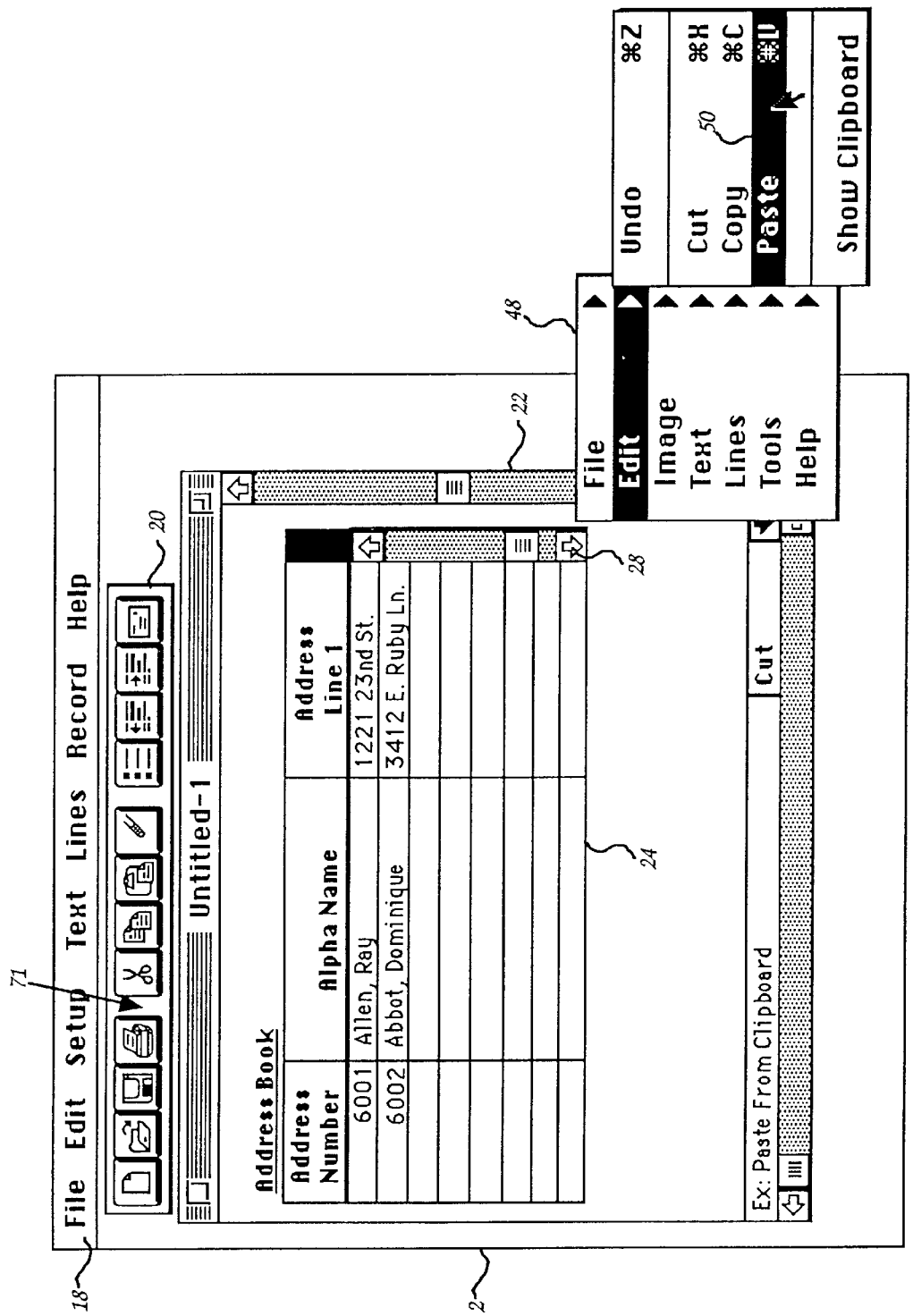
FIG. 3B shows the menubar pop-up menu displayed when the user selects the hyperbutton navigating icon.

FIGS. 3A–3D illustrate graphically, and through a flow chart, the operation of the hyperbutton 40 of the present invention. In a preferred embodiment, the hyperbutton 40 is displayed in a persistent subview 42 at the lower right corner of window 22 and comprises a title 44 and a navigating icon 46. The hyperbutton's subview 42 is deemed persistent because it is displayed persistently, as opposed to a pull-down menu or pop-up menu which is displayed temporarily. The hyperbutton's title 44 reflects the title of a default item selected by the user from a common hypercontrol specification. If the user depresses the mouse cursor in any part of the title view 44, then the default menu command is automatically executed without having to plod through the pull-down menus of the menu bar 18. If the user selects the navigating icon 46 (i.e., the down arrow), then the hyperbutton displays a pop-up menu 48 of the common specification, as shown in FIG. 3B. All of the hypercategories and hyperitems of the common specification available directly, or through pull-down menus, from the menubar 18 of FIG. 3.

The hyperbutton's pop-up menu 48 contains a select number of the hypercategories from the common specification. The pop-up menu shown in FIG. 3B contains all of the hypercategories; however, this is not a requirement of the invention, and the pop-up menu may contain fewer than all of the hypercategories. The user can also specify which hyperitems that will appear in the hyperbutton's pop-up menu 48 for each menu category. This is accomplished by customizing the hyperbutton pop-up menu 46 using a menu control editor as described in greater detail below.

Figure 3C:
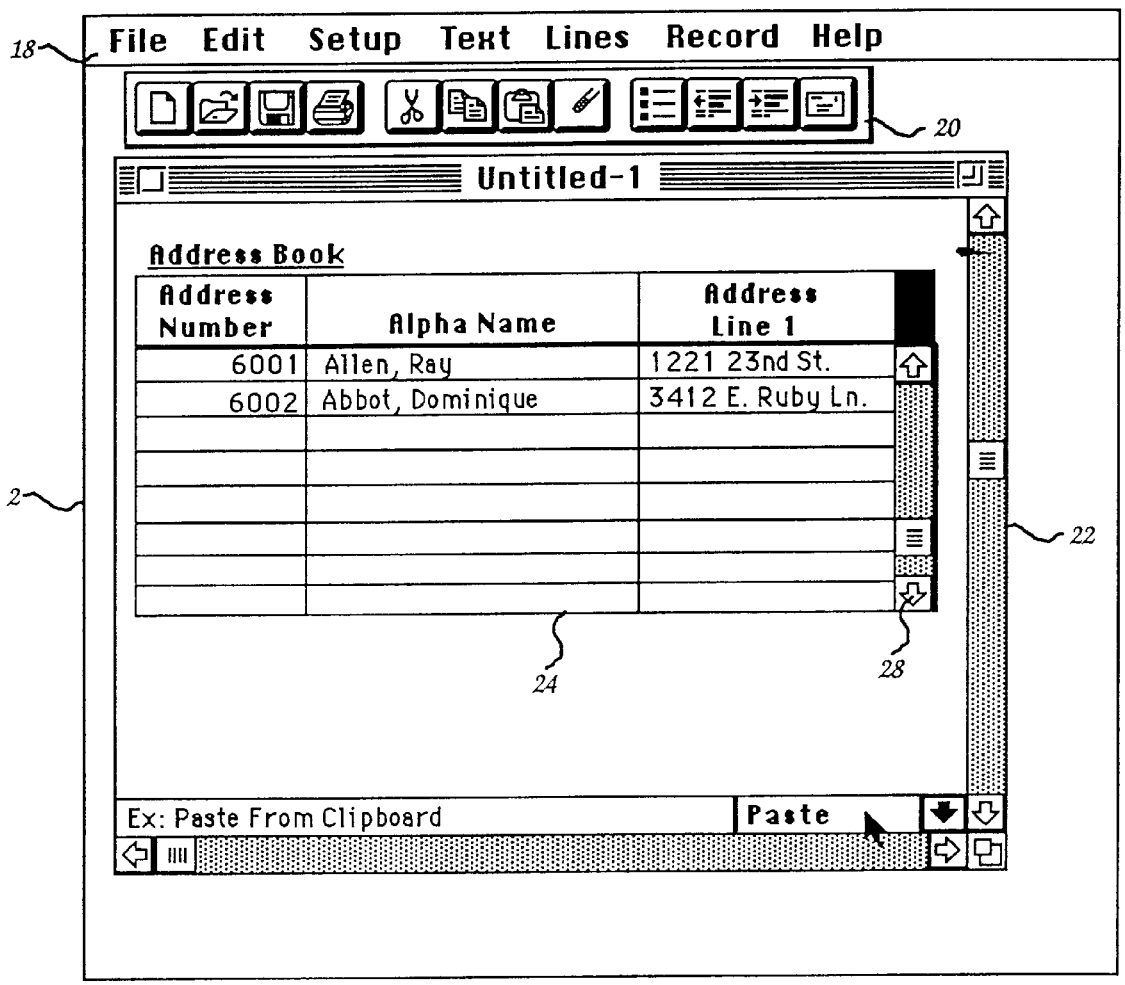
FIG. 3C demonstrates how the title of the hyperbutton changes when the user selects a new default menu item from the menubar pop-up menu.

After selecting the hyperbutton's navigating icon 46 and displaying the hyperbutton's pop-up menu 48, the user can select and immediately execute a menu item from the pop-up menu 48 (such as "Paste" 50), which will change the hyperbutton's default menu item automatically to the selected hyperitem. If the user changes the default menu item for the hyperbutton (e.g., by selecting the "Paste" 50 hyperitem), then the hyperbutton title 44 changes accordingly as shown in FIG. 3C. Thereafter, whenever the user selects the hyperbutton with the mouse, the new default hyperitem is automatically executed. The hyperbutton's pup-up menu 48 is displayed until the user selects a menu item or cancels the operation by not selecting any hyperitem.

If the user places the mouse cursor over the hyperbutton title 44 without selecting it, an explanation of the default menu item is displayed in the explanation view 19 of the window 22 at the lower left corner of window 22. Similarly, as the user scrolls through the hyperbutton pop-up menu 48 (as shown in FIG. 3B), an explanation of each menu item is provided in the explanation view 19.

Hyperbutton: Operation

Figure 3D:
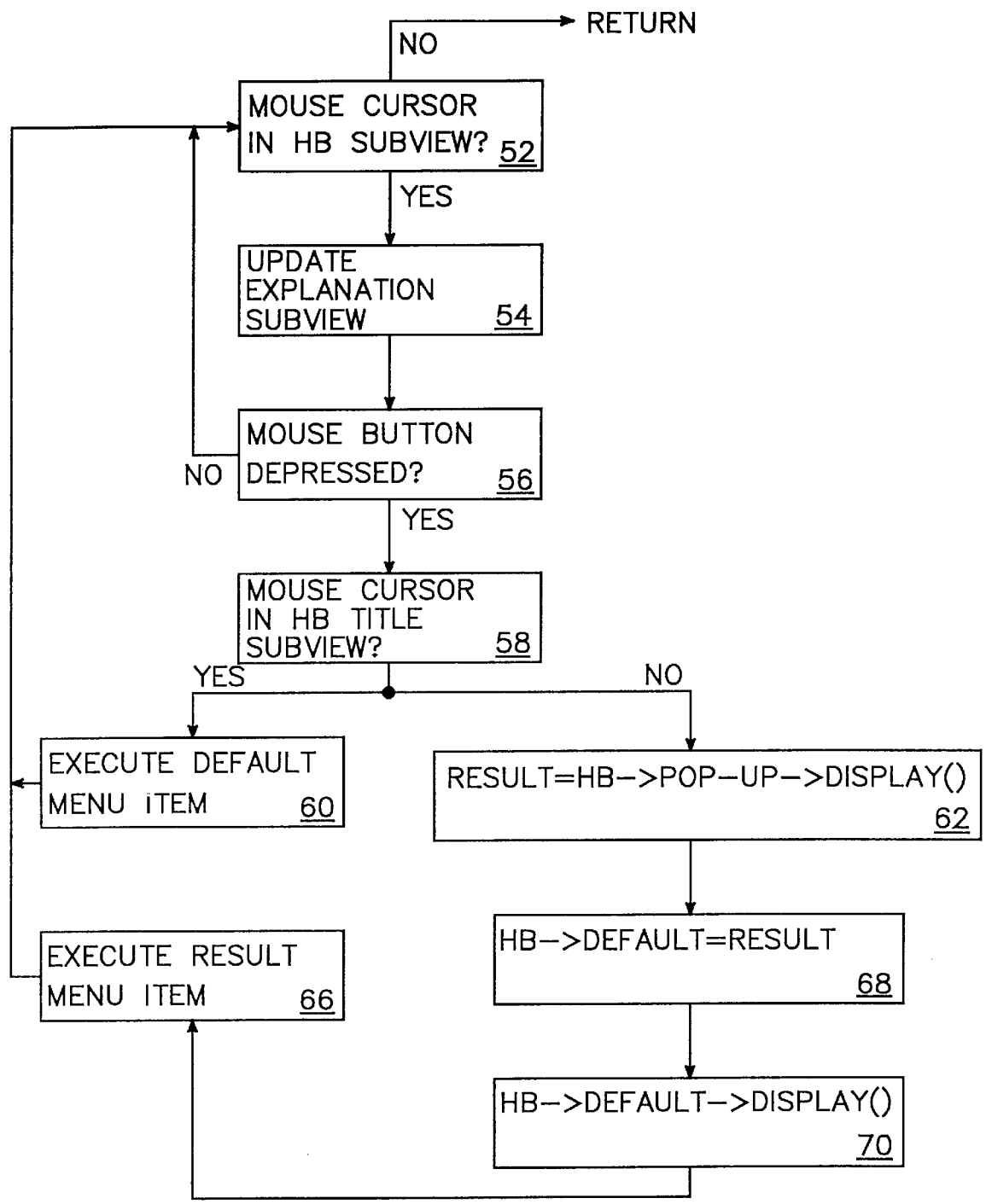
FIG. 3D is an execution flow diagram for the hyperbutton of the present invention.

FIG. 3D shows an operational flow chart for the hyperbutton within the hypercontrol of the present invention. The flow chart for the hyperbutton can be implemented by a programmer who initially develops the user application; that is, the executable code for the hyperbutton and the menu control editor are actually linked into the user application. In an alternative embodiment, the hyperbutton and menu control editor are implemented as device driver. In this manner, the user can configure the hyperbutton for any user application using the menu control editor described below.

In the flow chart of FIG. 3D, the hyperbutton is described as an object using object oriented programming notations of C++; however, the hyperbutton could also be implemented using standard procedural programming. The flow chart assumes that a hyperbutton object has already been created and initialized with the settings configured by the hyperitem editor. The name of the hyperbutton object is "HB", and hereinafter the program that implements the hyperbutton is referred to as the "hyperbutton", whether it is linked into the user application or implemented as a device driver.

While a user application is running, the hyperbutton continually checks 52 to see if the user has moved the mouse cursor into the hyperbutton's subview 42. If so, then the hyperbutton updates 54 the explanation view 19 at the bottom left corner of window 22, thereby displaying an explanation of the hyperbutton's default menu item. If while the mouse cursor is in the hyperbutton's subview, the user depresses the mouse button 56, then the hyperbutton checks 58 to determine whether the mouse cursor is in the title 44 or in the navigating icon 46 part of the hyperbutton's subview 42.

If the mouse cursor is in the title view 44 of the hyperbutton's subview 42 when the user depresses the mouse button, then the hyperbutton generates a menubar event, inserts the default hyperitem, and passes the event onto the user application for processing 60. If the hyperbutton's default hyperitem were "Cut", for example, then the application would delete any text selected by the user and copy it to a clipboard.

If the mouse cursor is in the navigating icon 46 of the hyperbutton's subview 42 when the user depresses the mouse button, then the hyperbutton displays its pop-up menu 62 which, in the flow chart of FIG. 3D, is implemented as an instance variable of the hyperbutton (HB). The pop-up menu is also shown as an object having a display method which returns the menu item selected by the user. If the user does not select a menu item from the pop-up menu 48, then the display method returns NULL. In either case, the menu item returned by the display method of the pop-up menu is assigned to the variable "result".

When the result indicates that the user made a selection, then the selected hyperitem is assigned to the hyperbutton's default menu item 68 and the title of the new default hyperitem is displayed 70 in the hyperbutton's title subview 44.

After executing the hyperbutton's default menu item 60, or executing a menu item from the hyperbutton's pop-up menu 66, or changing the hyperbutton's default menu item 70, the hyperbutton returns to the beginning of the flow chart and continues checking the mouse cursor to see if it is within the hyperbutton's subview 52.

Hypercontrol: Toolbar Hyperbutton

Figure 4A:
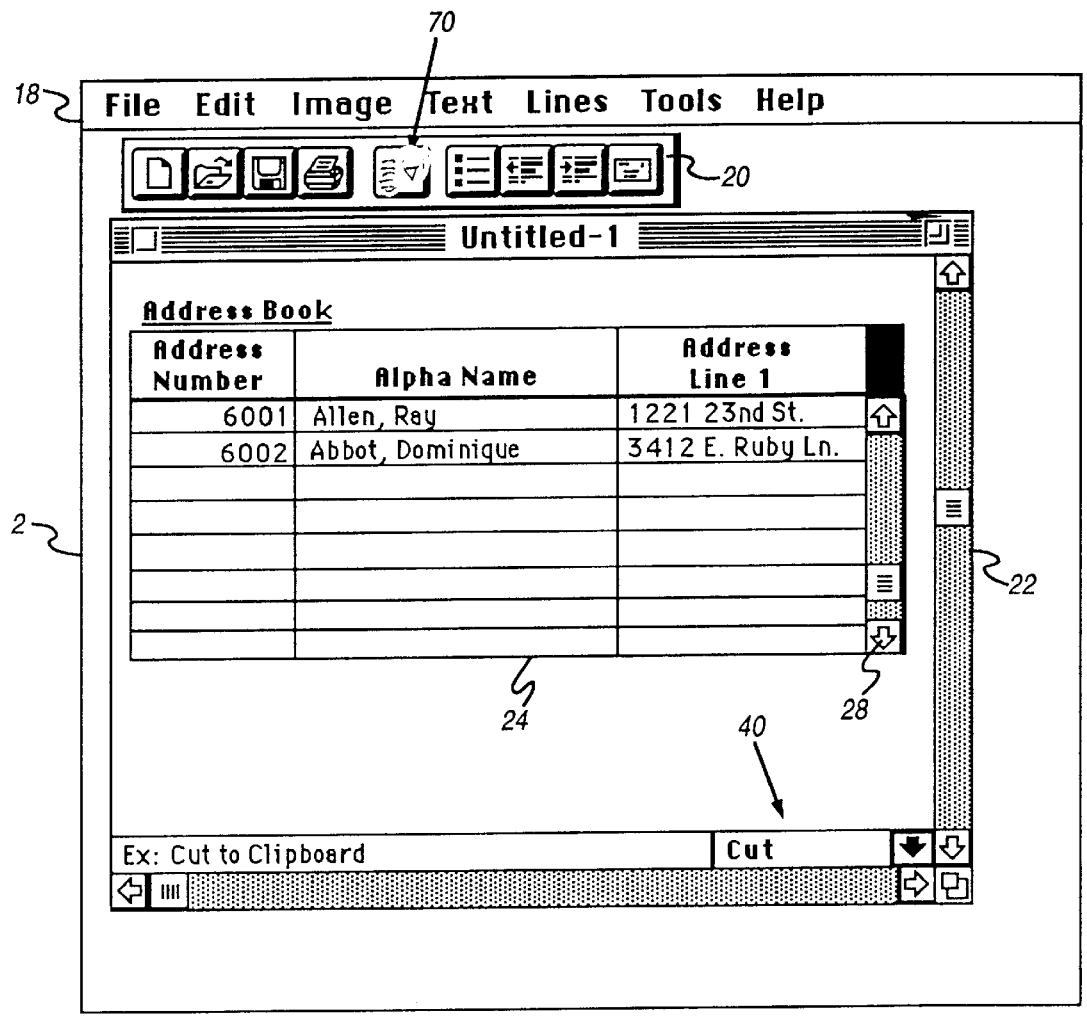
FIGS. 4A and 4B shows the hyperbutton of the present invention implemented as a control icon in a toolbar.

An alternative embodiment of the hyperbutton control 40 as described in FIGS. 3A–3D is a toolbar hyperbutton 70 as shown in FIG. 4A. The control icons in the toolbar 20 of FIG. 3A are displayed in groups, where each group represents a corresponding hypercategory of the menubar 18. In FIG. 4A, the toolbar control icons of FIG. 3A that represent the menu items of the "Edit" menu category (i.e., "Cut", "Copy" "Paste" and "Undo") have been compressed into a single hyperbutton icon 70. The icon displayed corresponds to the hyperbutton's default menu item which, in FIG. 4A, is the "Cut" or "Scissors" icon. If the user selects the hyperbutton icon 70 with the mouse, then the corresponding default menu item is automatically executed.

Figure 4B:
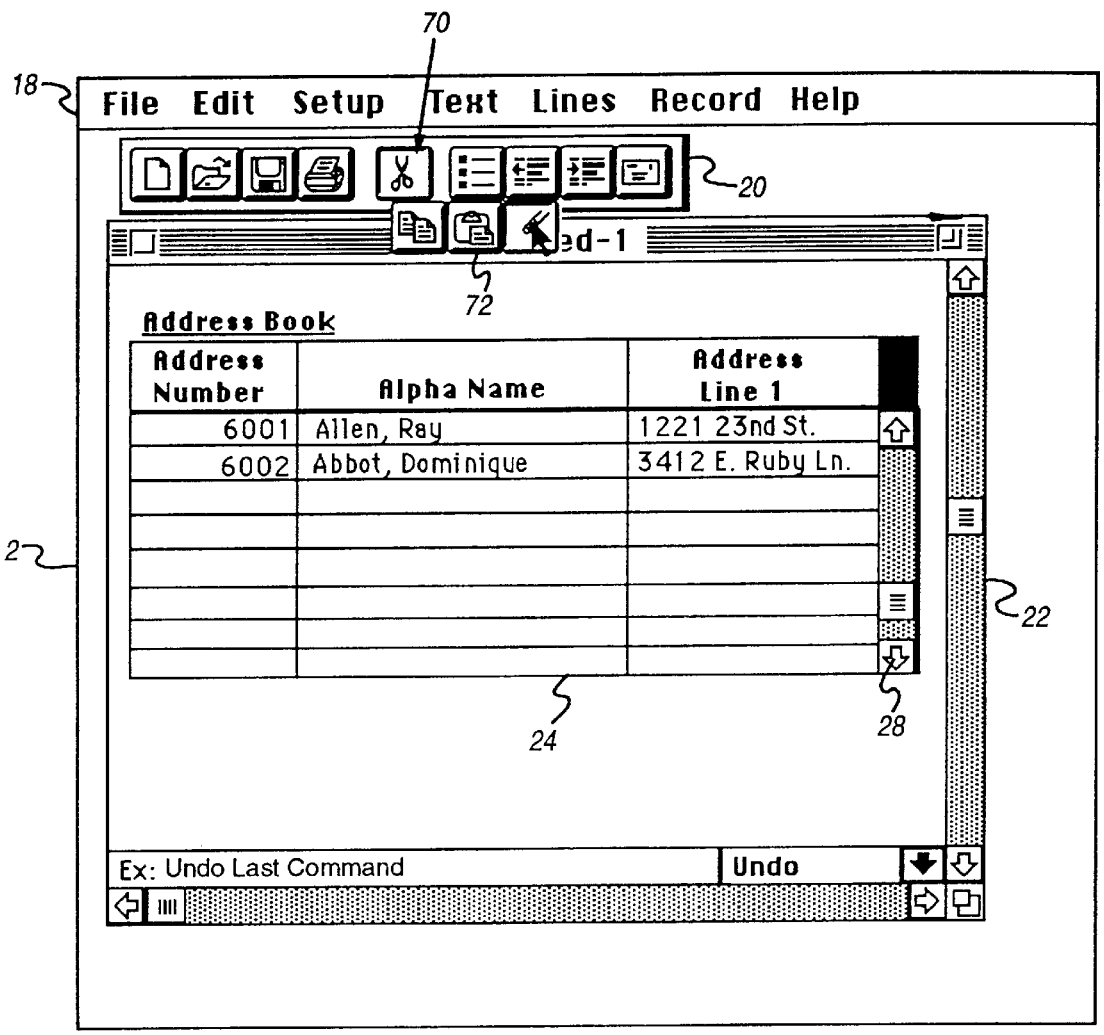

If the hyperbutton 70 represents a hypercategory, then a pop-up icon menu 72 containing the icons within the hypercategory is displayed, as shown in FIG. 4B, when the user selects the hyperbutton.

In an alternative embodiment, the hyperbutton's pop-up icon menu 72 contains all of the control icons in the toolbar 20. In this manner, the user can select any one of the toolbar icons.

Context Sensitive Pop-Up Menu

Figure 5:
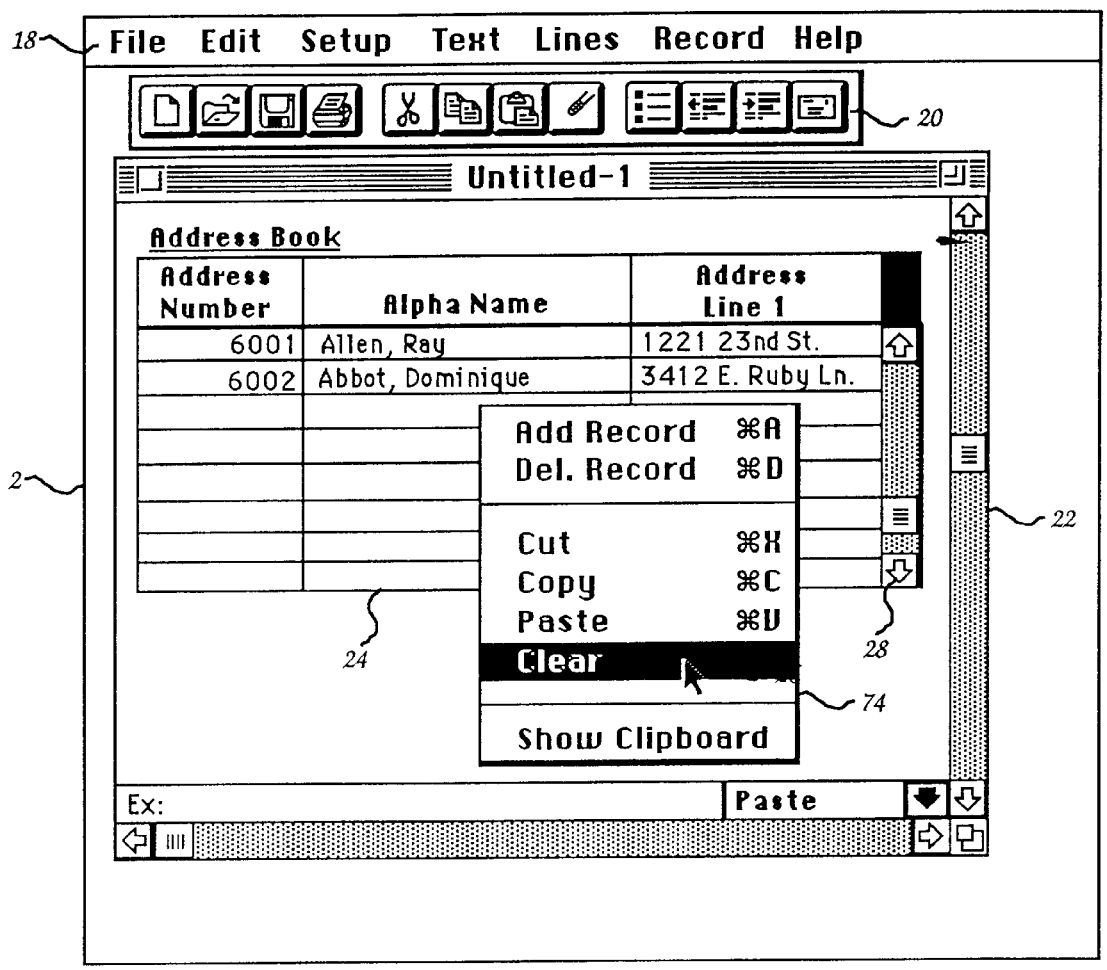
FIG. 5 shows a context sensitive pop-up menu of the present invention displayed when the user depresses the right mouse button while the mouse cursor is within a grid subview.

Referring now to FIG. 5, shown is a context sensitive pop-up menu 74 of the hypercontrol of the present invention. It is referred to as "context sensitive" because the pop-up menu 74 is displayed only when the user places the mouse cursor in the grid subview 24 and depresses the right mouse button. The hyperitem editor (described below) allows the user to configure the pop-up menu 74 with a custom set of menu items associated with the grid subview 24.

For example, consider that the grid subview 24 of FIG. 5 is an Address Book of records, where each record comprises the fields: "Address Number", "Alpha Name", and "Address Line 1". Assume also that the menu items used to edit the Address Book records include the menu items from the "Edit" menu category: "Cut", "Copy", "Paste", and "Clear", and two menu items from the "Record" menu category:

"Add Record" and "Del. Record". Using the hyperitem editor as described below, the user can collect these menu items into the context sensitive pop-up menu 74, thereby providing immediate access to the menu items rather than having to plod through the pull-down menus of the menu categories in the menu bar 18.

When the user places the mouse cursor in the grid subview 24 and presses the right mouse button, the context sensitive pop-up menu 74 is displayed until the user selects a menu item or cancels the operation by, for instance, releasing the mouse button without selecting a menu item. If the user selects a menu item, then the corresponding command is executed by the application.

Hyperitem Editor

Figure 6A:
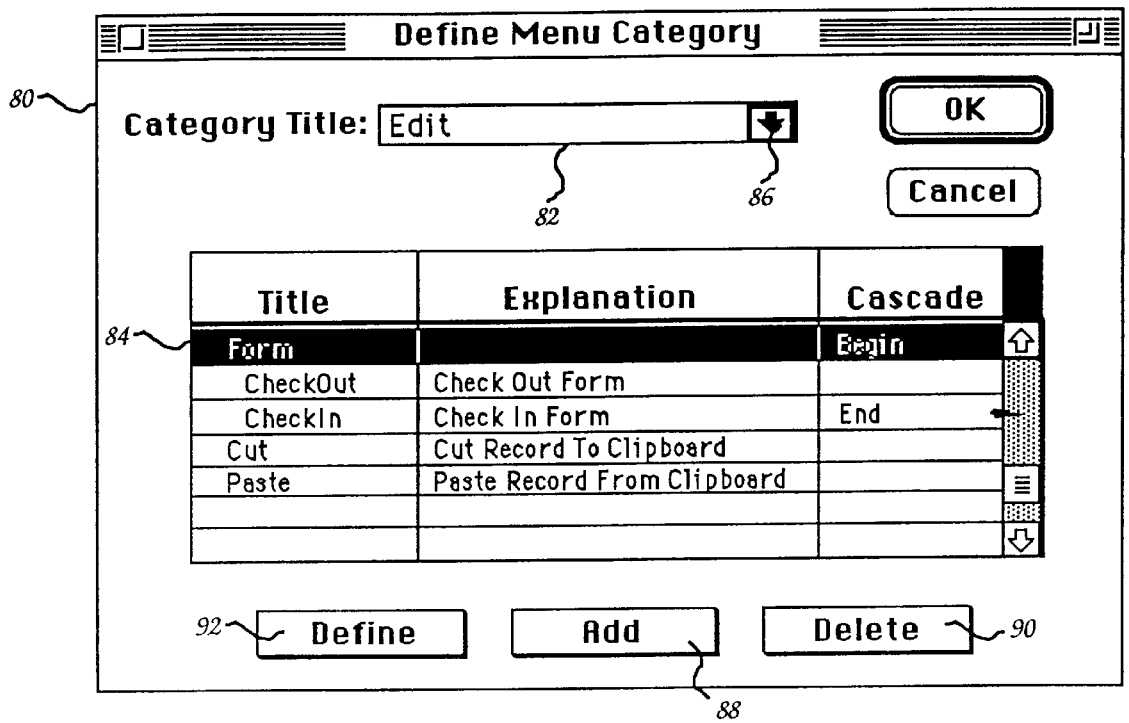
FIGS. 6A and 6B show modal dialogs of a control editor for configuring the menubar, toolbar, hyperbutton and context sensitive pop-up menus of the present invention.
Figure 6B:
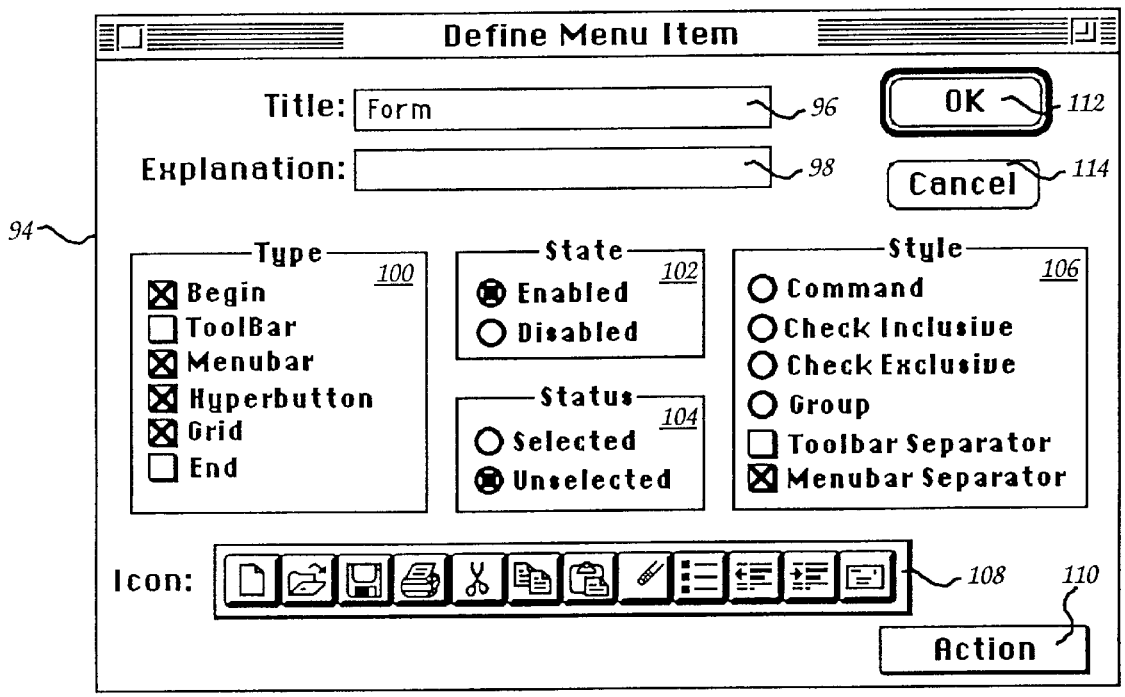

FIGS. 6A and 6B show modal dialogs that implement a hyperitem editor of the present invention. In a graphical user interface, a modal dialog is a window displayed to the user for configuring an application. An example modal dialog is the well known "Print" window displayed when the user selects the "Print" menu item from the "File" menu category. This dialog allows the user to configure the printer settings, such as number of copies, page range, landscape v. portrait, etc., before printing a document. Similar to the "Print" modal dialog, the modal dialogs of the menu control editor shown in FIGS. 6A and 6B allow the user to configure the menubar, toolbar, hyperbutton, and context sensitive pop-up menu for a user application.

The "Define Menu Categories" 80 modal dialog of FIG. 6A allows the application developer to configure the menu categories of the hypercontrol. A "Category Title" subview 82 displays the title of the menu category currently being configured by the user. A grid subview 84 displays the menu items associated with the menu category. In the example shown in FIG. 6A, the menu control editor is displaying the "Edit" menu category in the "Category Title" subview 82 with its corresponding menu items displayed in the grid subview 84. The application developer can change menu categories by selecting another one from a pull-down menu displayed when the user selects a navigating icon 86 in the "Category Title" subview 82. One of the menu items in the pull-down menu is "Add New Category" and, when selected by the application developer, it creates a new menu category which is inserted into the menu bar 18.

The grid subview 84 of FIG. 6A lists the menu items for the selected menu category in three columns: "Title" which displays the title for the menu item; "Explanation" which displays a description of the menu item; and "Cascade" which indicates whether the listed menu item is in a cascaded menu category. The "Explanation" is displayed in the explanation subview 19 at the lower left corner of the application window 22, as shown in FIG. 3A, when the user selects the menu item. An up-down scroll bar along the right side of the grid subview 84 allows the user to scroll through the list of menu items.

Figure 6C:
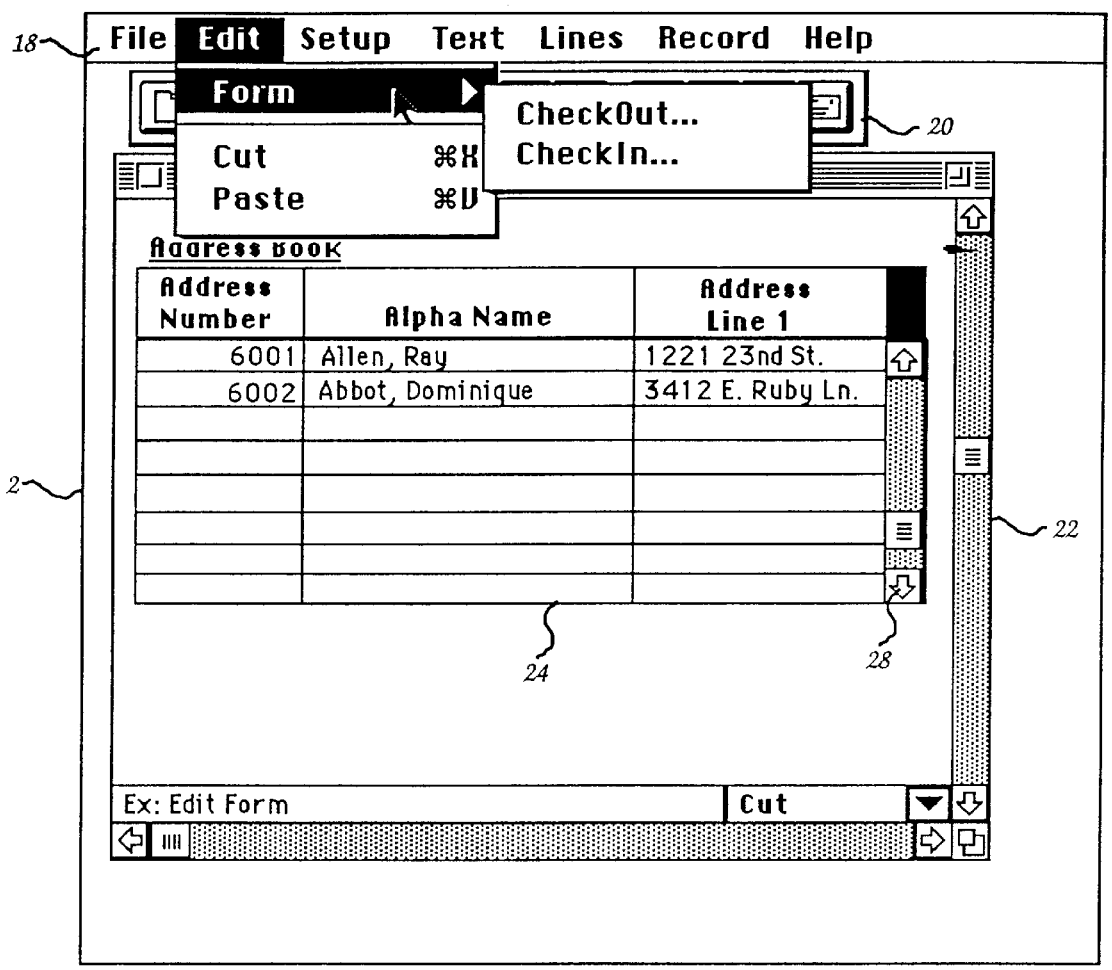
FIG. 6C illustrates a resulting pull-down menu from the menu bar after the user configures it using the control editor of the present invention.

Referring now to the "Cascade" attribute for a menu item, if it is "Begin", then that menu item is displayed as a cascaded menu category. The menu items included in a cascaded menu category include all of the menu items immediately after the "Begin" up to and including a menu item with a "Cascade" attribute of "End". For example, the first menu item displayed in FIG. 6A is "Form" and it has a "Begin" attribute. As shown in FIG. 6C, this means that the "Form" menu item is displayed as a cascaded menu category and includes the menu items "CheckOut" and "CheckIn" since the "CheckIn" menu item has the corresponding "End" attribute. The user can also implement a cascaded menu within a cascaded menu by using multiple, nested "Begin" and "End" attributes.

To add or delete menu items from the current menu category, the control editor provides an "Add" 88 and "Delete" 90 control button as shown in FIG. 6A. To modify the attributes of a selected menu item, the control editor provides a "Define" 92 control button which, when selected by the user, displays a "Define Menu Item" 94 modal dialog as shown in FIG. 6B.

After depressing the "Define" 92 control button to open the "Define Menu Item" 94 modal dialog, the user enters or modifies a title for the selected menu item in a "Title" subview 96 and enters or modifies a description in a "Explanation" subview 98. The user also configures a number of attributes for the menu item using a plurality of radio buttons and check boxes. The attributes are categorized into a "Type" 100, "State" 102, "Status" 104, and "Style" 106.

The "Type" 100 attributes determine whether the selected menu item will appear in the Menubar 18, Toolbar 20, Hyperbutton pop-up menu 48, or Grid context sensitive pop-up menu 74. A menu item can be configured to appear in any one, or all of these GUI interface controls by checking the corresponding box. In the example of FIG. 6B, the "Form" menu item will appear in the Menubar 18, the Hyperbutton pop-up menu 48, and the Grid context sensitive pop-up menu 74, but it will not appear in the Toolbar 20. The "Begin" and "End" attributes specify whether the selected menu item will begin or end a cascaded menu category as described above. In this example, the "Form" menu item of the "Edit" menu category has been assigned a "Begin" attribute; thus the "Form" menu item will appear as a cascaded menu category in the user application as shown in FIG. 6C.

The "State" 102 attributes determine whether the selected menu item will be displayed initially as "Enabled" or "Disabled". If a menu item is disabled, then its text will be "greyed out" indicating that it cannot be selected. For example, when the user initially begins an application the "Paste" menu item in the "Edit" menu category will normally be disabled or "greyed out" until the user copies some information to the clipboard.

The "Status" 104 attributes determine whether the selected menu item will be displayed initially with a check mark indicating that the menu item is active. In the "Text" pull-down menu of FIG. 2B, for example, the "Plain Text" menu item is displayed initially with a check mark, indicating that any text typed by the user will appear in an unmodified style. If the user selects the "Bold" menu item from the "Text" menu category, then the check next to the "Plain Text" menu item will be erased and the "Bold" menu item will be displayed with a check. Thereafter, any text entered will be in boldface.

The "Style" 106 attributes for the selected menu item include:

Command specifies that the menu item will generate a command processed by the user application. For example, the "Copy" menu item in the pop-up menu of FIG. 3B will generate a command that instructs the user application to copy user selected text to the clipboard.

Group specifies that the menu item belongs to a group of menu items. For example, in the "Text" menu category of FIG. 2B the menu items "Show Text" and "Hide Text" are assigned to a group. Only one of these menu items can be selected at one time; that is, either the text in the grid subview 24 will be displayed or hidden, but not both.

Check specifies that if the menu item belongs to a
Inclusive group, then more than one menu item in the group can be active at one time. For example, in the "Text" menu category of FIG. 2B, the menu items "Bold", "Italic", "Underline", etc., belong to a group where more than one of the menu items can be active at one time; that is, the user can modify the style of selected text by making it boldfaced, italicized, and underlined. In contrast, only one font size in the "Size" cascaded menu category can be selected at one time.

Check specifies that if the menu item belongs to a
Exclusive group, then not more than one of the menu items in the group can be active at one time. For example, only one font size in the "Size" cascaded menu category of FIG. 2B can be selected at one time.

Toolbar specifies that a separator will appear after
Separator the control icon in the toolbar. For example, the print icon 32 in the toolbar 20 of FIG. 3B has a separating space 71 between it and the next control icon.

Menubar specifies that a separator will appear after
Separator the menu item in the menu category. For example, the "Paste" menu item in the pop-up menu of FIG. 3B has a line separator between it and the next menu item "Show Clipboard".

If the user specifies that the selected menu item is to be displayed in the Toolbar 20, then the user selects an icon for the menu item from a list of icons 108 of FIG. 6B.

The selected menu item may also be associated with a user defined macro. Macros are user defined procedures implemented as an extension of the user application, and they allow the user to extend and customize operation of the user application. When a user selects a menu item associated with a user defined macro, the menu item's event signals the user application to execute the macro. To create and associate a user macro with a menu item, the user selects the "Action" 110 button from the "Define Menu Item" 94 modal dialog. The present invention will then display another dialog (not shown) which allows the user to create and edit a user defined macro. Extending the operation of a user application through user defined macros is well known by those skilled in the art of computer programming. The details for implementing user defined macros is not necessary for an understanding of the present invention.

When finished editing a selected menu item in the "Define Menu Item" 94 modal dialog, the user can save the changes by pressing an "OK" 112 button or can cancel the changes by pressing a "Cancel" 114 button. FIG. 6C shows the end result of the "Edit" menu category after configuring its menu items and attributes as shown in the modal dialogs of FIGS. 6A and 6B.

Many changes in form and detail could be made without departing from the scope of the present invention; the particular embodiments disclosed herein are not intended to be limiting. The scope of the invention is properly construed from the following claims.

We claim:

1. A graphical user interface menu control system for configuring and accessing menu items that control operation of a computer application, comprising:
   (a) a menubar comprising a persistent menubar view for displaying a plurality of menu categories or menu items, wherein
      (a1) each menu category comprises at least one menu item displayed in a pull-down menu when a user selects the menu category, and
      (a2) when the user selects the menu item, a corresponding command is executed by the computer application; and
   (b) a hyperbutton comprising
      (b1) a pop-up menu comprising at least one of the menu items, the pop-up menu being displayed when the user sends a first control signal to the computer application, and
      (b2) a default menu item selected from the menu items of the pop-up menu, wherein the command corresponding to the default menu item is executed when the user sends a second control signal to the computer application.

2. The graphical user interface menu control system as recited in claim 1, wherein the hyperbutton comprises a persistent view for displaying the default hyperitem.

3. The graphical user interface menu control system as recited in claim 2, wherein the default hyperitem comprises a text title displayed in the persistent view of the hyperbutton.

4. The graphical user interface menu control system as recited in claim 2, wherein the default hyperitem comprises an icon displayed in the persistent view of the hyperbutton.

5. The graphical user interface menu control system as recited in claim 4, wherein each hyperitem in the pop-up menu is displayed as a control icon.

6. The graphical user interface menu control system as recited in claim 4, further comprising a hyperitem editor for selectively inserting a hyperitem into the pop-up menu of the hyperbutton.

7. The graphical user interface menu control system as recited in claim 2, wherein:
   (a) the persistent view further displays a navigating icon connected to the pop-up menu; and
   (b) when the user selects the navigating icon, the first control signal is sent to the computer application to display the pop-up menu.

8. The graphical user interface menu control system as recited in claim 1, further comprising a toolbar comprising:
   (a) a persistent toolbar view for displaying a first control icon connected to a corresponding hyperitem of at least one of the menu categories, wherein the computer application executes the command connected to the hyperitem when the user selects the first control icon.

9. The graphical user interface menu control system as recited in claim 8, further comprising a hyperitem editor for connecting a control icon to a hyperitem.

10. The graphical user interface menu control system as recited in claim 1, further comprising a hyperitem editor for selectively inserting a hyperitem into the pop-up menu of the hyperbutton.

11. A method of controlling a menu system in a graphical user interface for configuring and accessing hyperitems that control operation of a computer application, comprising the steps of:
   (a) persistently displaying a menubar comprising a plurality of hypercategories or hyperitems, each hypercategory comprising at least one hyperitem;
   (b) displaying the hyperitem of a hypercategory in a pull-down menu when the user selects the hypercategory;
   (c) executing an application command corresponding to the hyperitem when the user selects the hyperitem;
   (d) persistently displaying a title of a hyperbutton, the title corresponding to a default hyperitem;
   (e) displaying a pop-up menu comprising at least one of the hyperitems when the user sends a first control signal, associated with the hyperbutton, to the computer application;

(f) selecting the default hyperitem from the pop-up menu; and (g) executing the default hyperitem when the user sends a second control signal associated with the hyperbutton to the computer application.

12. A graphical user interface menu control system for configuring and accessing hyperitems that control operation of a computer application, comprising:

(a) a menubar comprising a persistent menubar view for displaying a plurality of hypercategories or hyperitems, wherein:

(a1) each hypercategory comprises at least one hyperitem displayed when a user selects the hypercategory; and (a2) when the user selects the hyperitem, a corresponding command is executed by the computer application;

(b) a modal dialog for implementing a hyperitem editor comprising:

(b1) a means for selectively inserting a hyperitem into a hypercategory; and (b2) a means for selectively inserting a hypercategory into the menubar.

13. The graphical user interface menu control system as recited in claim 12, further comprising:

(a) a toolbar comprising a persistent toolbar view for displaying a plurality of control icons associated with corresponding hyperitems of at least one of the hypercategories, wherein the computer application executes the command associated with the hyperitem when the user selects a corresponding control icon; and (b) the hyperitem editor further comprising a means for selectively inserting a control icon for a hyperitem into the toolbar.

14. The graphical user interface menu control system as recited in claim 12, wherein the hyperitem editor further comprises a means for configuring the menu categories into cascaded menus.

15. The graphical user interface menu control system as recited in claim 12, further comprising a hyperbutton comprising:

(a) a pop-up menu comprising at least one of the hypercategories displayed when the user sends a first control signal to the computer application; and (b) a default hyperitem selected from the pop-up menu and executed when the user sends a second control signal to the computer application.

16. The graphical user interface menu control system as recited in claim 15, wherein the hyperitem editor further comprises a means for selectively inserting a hyperitem into the pop-up menu of the hyperbutton.

17. In a graphical user interface, a method of configuring and accessing hyperitems that control operation of a computer application, comprising the steps of:

(a) persistently displaying a menubar comprising a plurality of hypercategories or hyperitems, each hypercategory comprising at least one hyperitem;

(b) displaying a hyperitem of a hypercategory in a pull-down menu when a user selects the hypercategory;

(c) executing an application command corresponding to the hyperitem if the user selects the hyperitem;

(d) displaying a modal dialog for implementing a hyperitem editor; and (e) selectively inserting a hyperitem into a hypercategory using the menu control editor.

18. A graphical button, displayed on a display device of a computer system, for controlling the operation of a computer application program operating within the computer system, the graphical button comprising:

a title view area for displaying a command name;

a navigating icon area for displaying a navigating icon;

a pop-up menu comprising at least one menu item that is also displayed within a menubar, wherein the menubar is displayed within the display device and separate from the graphical button, the pop-up menu being displayed when the user selects the navigating icon; and a default menu item previously selected from the menu items of the pop-up menu, wherein a name of the default menu item is displayed within the title view area, and further wherein a command corresponding to the default menu item is executed when the user selects the title view area;

wherein when the user selects an item from the pop-up menu, a command corresponding to the selected item is executed, and the item selected becomes the default menu item whose name is displayed within the title view area.

19. The graphical button of claim 18, further comprising an editor for selecting a menu item from the menubar and inserting the selected menu item into the pop-up menu.

* * * * *